United States Patent
Gupta et al.

(10) Patent No.: US 12,353,811 B2
(45) Date of Patent: Jul. 8, 2025

(54) OUT-OF-CONTEXT TIMING CONSTRAINTS MODIFICATION FOR INTERIOR PINS

(71) Applicant: International Business Machines Corporation, Armonk, NY (US)

(72) Inventors: Saurabh Gupta, Bangalore (IN); Chithra Ravindranath, Horamavu (IN); Gireesh Kumar K M, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 17/674,890

(22) Filed: Feb. 18, 2022

(65) Prior Publication Data

US 2023/0267251 A1    Aug. 24, 2023

(51) Int. Cl.
| | | |
|---|---|---|
| *G06F 30/30* | (2020.01) | |
| *G06F 30/327* | (2020.01) | |
| *G06F 30/3312* | (2020.01) | |
| *G06F 30/392* | (2020.01) | |
| *G06F 30/398* | (2020.01) | |
| *G06F 119/12* | (2020.01) | |

(52) U.S. Cl.
CPC ........ *G06F 30/3312* (2020.01); *G06F 30/327* (2020.01); *G06F 30/392* (2020.01); *G06F 30/398* (2020.01); *G06F 2119/12* (2020.01)

(58) Field of Classification Search
CPC .............. G06F 30/327; G06F 30/3312; G06F 2119/12; G06F 30/392; G06F 30/398
See application file for complete search history.

(56) References Cited

U.S. PATENT DOCUMENTS

| | | | |
|---|---|---|---|
| 6,014,506 A | 1/2000 | Hossain et al. | |
| 6,606,730 B1* | 8/2003 | Yoshimaru | G06F 30/392 |
| | | | 716/124 |
| 7,577,933 B1 | 8/2009 | Wu et al. | |
| 9,639,644 B1* | 5/2017 | Liu | G06F 30/327 |
| 9,858,377 B2 | 1/2018 | Berry et al. | |
| 9,910,952 B2 | 3/2018 | Affeldt et al. | |
| 10,146,902 B2 | 12/2018 | Pandey et al. | |
| 10,157,255 B2 | 12/2018 | Affeldt et al. | |
| 10,289,797 B1 | 5/2019 | Viswanathan et al. | |
| 10,360,341 B2* | 7/2019 | Chakraborty | G06F 30/392 |

(Continued)

OTHER PUBLICATIONS

Kim et al. "ICCAD—2015 CAD contest in incremental timing-driven placement and benchmark suite," 2015 IEEE/ACM International Conference on Computer-Aided Design (ICCAD), 2015, pp. 921-926.

(Continued)

*Primary Examiner* — Leigh M Garbowski
(74) *Attorney, Agent, or Firm* — CANTOR COLBURN LLP; Randy Tejeda

(57) ABSTRACT

Embodiments are for using out-of-context timing constraints modification for pins of a macro an integrated circuit (IC). A technique includes moving at least one pin of a macro during synthesis for the IC, in response to performing synthesis on a specification for the IC and determining a distance that the at least one pin moved from an original location to a new location in the macro. The technique includes determining a delay based at least in part on the distance moved and using the delay to determine a signal timing at the least one pin at the new location in the macro.

20 Claims, 9 Drawing Sheets

(56) References Cited

U.S. PATENT DOCUMENTS

2006/0190884 A1\* 8/2006 Nishida ............... G06F 30/3312
 716/139
2016/0232276 A1\* 8/2016 Daellenbach ......... G06F 30/398
2017/0132349 A1\* 5/2017 Berry .................... G06F 30/392

OTHER PUBLICATIONS

Viswanathan et al., "ITOP: Integrating Timing Optimization Within Placement," Proceedings of the 19th International Symposium on Physical Design, Mar. 14-17, 2010, pp. 83-90.

\* cited by examiner

FIG. 7 700

→ MOVE AT LEAST ONE PIN OF A MACRO DURING SYNTHESIS FOR AN INTEGRATED CIRCUIT (IC), IN RESPONSE TO PERFORMING SYNTHESIS ON A SPECIFICATION FOR THE IC 702

→ DETERMINE A DISTANCE THAT THE AT LEAST ONE INTERIOR PIN MOVED FROM AN ORIGINAL LOCATION TO A NEW LOCATION IN THE MACRO 704

→ DETERMINE A DELAY BASED AT LEAST IN PART ON THE DISTANCE MOVED 706

USE THE DELAY TO DETERMINE A SIGNAL TIMING AT THE AT LEAST ONE INTERIOR PIN AT THE NEW LOCATION IN THE MACRO 708

FIG. 8
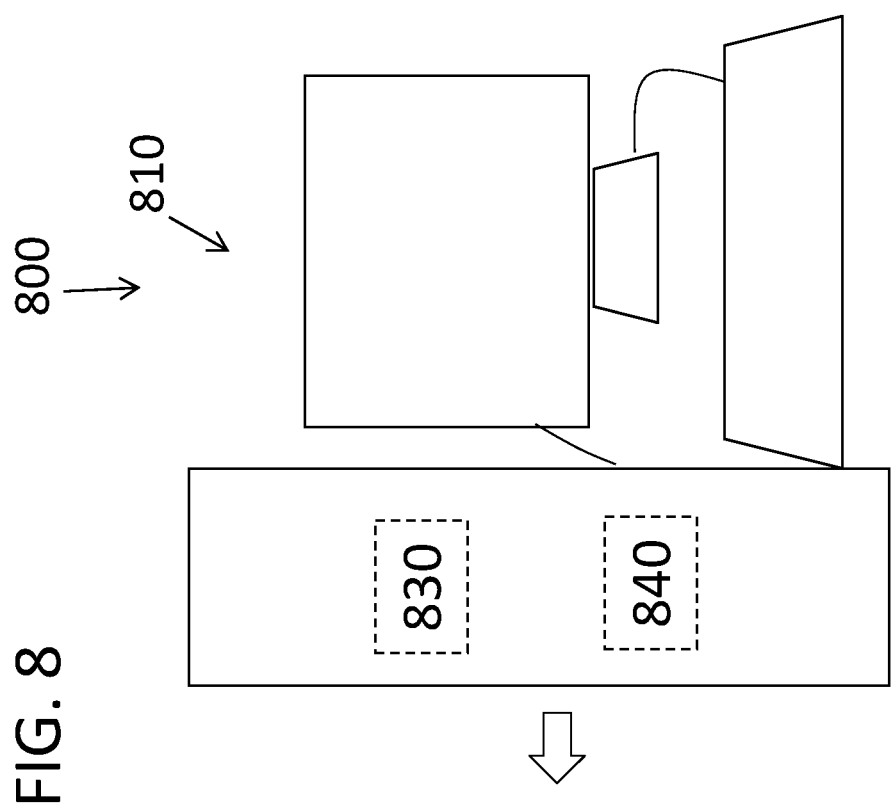
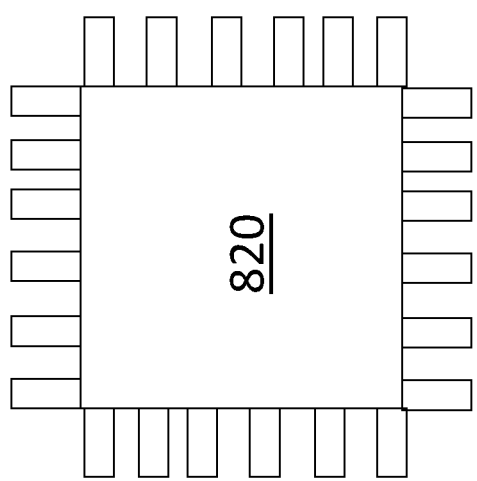

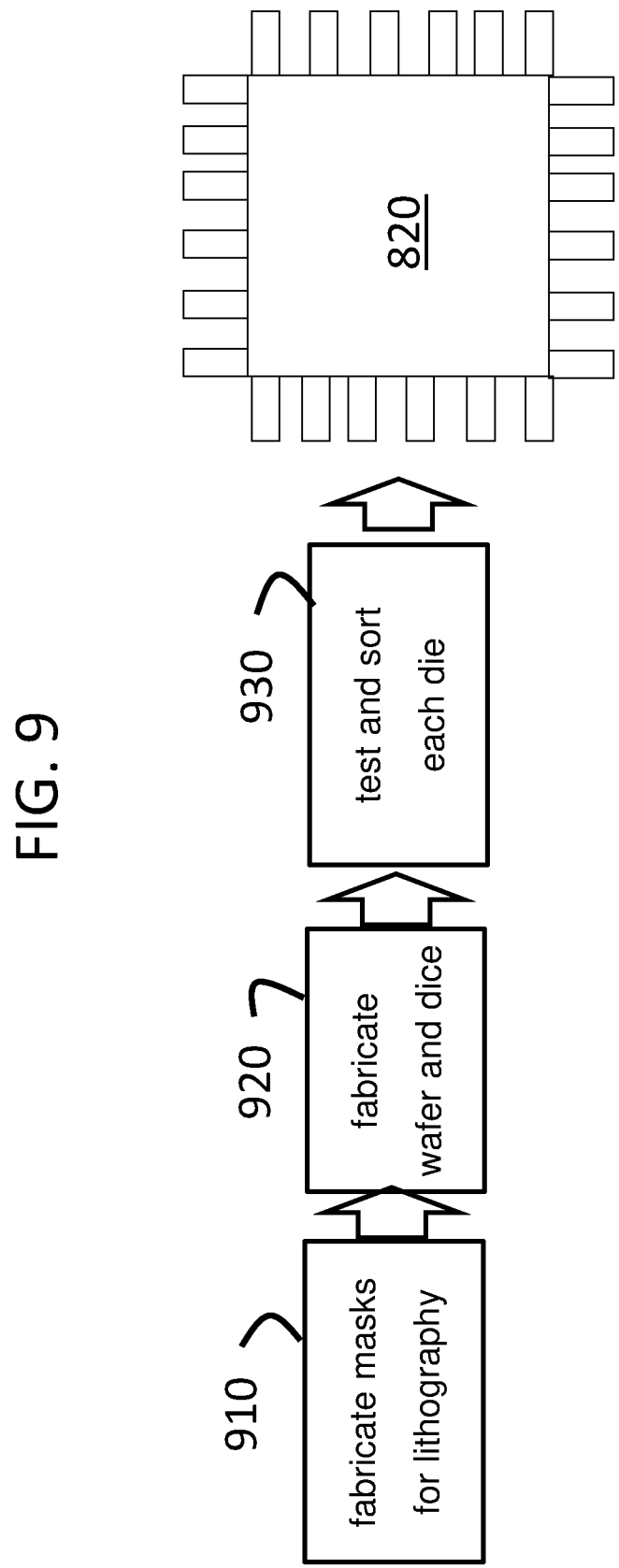

OUT-OF-CONTEXT TIMING CONSTRAINTS MODIFICATION FOR INTERIOR PINS

BACKGROUND

The present invention generally relates to fabrication methods and resulting structures for integrated circuits, and more specifically, to fabrication methods and resulting structures configured and arranged for out-of-context timing constraints modification for interior pins of a macro.

An integrated circuit (IC) chip is fabricated by first conceiving the logical circuit description and then converting that logical description into a physical description or geometric layout. This process is usually carried out using a "netlist," which is a record of all of the nets or interconnections between the cell pins. A layout typically includes a set of planar geometric shapes in several layers. The layout is then checked to ensure that it meets all of the design requirements, particularly timing requirements. The result is a set of design files known as an intermediate form that describes the layout. The design files are then converted into pattern generator files that are used to produce patterns called masks by an optical or electron beam pattern generator. During fabrication, these masks are used to pattern a silicon wafer using a sequence of photolithographic steps. The process of converting the specifications of an electrical circuit into a layout is called the physical design.

Cell placement in semiconductor fabrication involves a determination of where particular cells should optimally (or near-optimally) be located on the surface of an integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turnaround time, and enhanced chip performance. Several different programming languages have been created for electronic design automation (EDA) including Verilog, very high-speed integrated circuit hardware description language (VHDL), and timing diagram markup language (TDML). A typical EDA system receives one or more high-level behavioral descriptions of an IC device and translates this high-level design language description into netlists of various levels of abstraction.

Although techniques for timing constraints of ICs are suitable for their intended purposes, one or more embodiments of the invention provide improvements using out-of-context timing constraints modification for interior pins of macros in an IC.

SUMMARY

Embodiments of the present invention are directed to methods for out-of-context timing constraints modification for pins of a macro, thereby generating a chip design resulting from the synthesis which is used to fabricate a semiconductor structure for an IC. A non-limiting example method includes moving at least one pin of a macro during synthesis for an IC, in response to performing the synthesis on a specification for the IC. The method includes determining a distance that the at least one pin moved from an original location to a new location in the macro and determining a delay based at least in part on the distance moved. The method includes using the delay to determine a signal timing at the least one pin at the new location in the macro.

This can provide an improvement over known methods for performing synthesis by efficiently modifying timing constraints for those pins which move in macros such that synthesis continues to work on timing for those pins using updated timing constraints in place of original timing constraints. This further has the benefits of reducing the number of iterations needed to settle the assertions for macros which would normally need feedback from parent timing runs, but one or more embodiments determine the updated timing constraints independently.

In addition to one or more of the features described above or below, or as an alternative, in further embodiments of the invention the signal timing is determined based on a metal layer associated with a unit comprising the macro. One or more embodiments advantageously determine the updated timing constraint for a pin moved within a macro during synthesis based on the metal layer of the unit, without further iterations of the synthesis and without requiring/requesting feedback of parent timing runs for the unit.

In addition to one or more of the features described above or below, or as an alternative, in further embodiments of the invention the signal timing is determined based on a metal layer that is greater than a metal layer ceiling of the macro. Even when the metal layer used by the parent or unit is not available, one or more embodiments advantageously determine the updated timing constraint for a pin moved within a macro during synthesis based on a metal layer greater than the metal layer ceiling of the macro, without further iterations of the synthesis and without requiring/requesting feedback of parent timing runs for the unit.

In addition to one or more of the features described above or below, or as an alternative, in further embodiments of the invention the at least one pin is an output pin of the macro, the output pin being configured to output a signal on a metal layer associated with a unit comprising the macro. One or more embodiments advantageously determine the updated timing constraint for the output pin moved within a macro during synthesis based on the metal layer of the unit, without further iterations of the synthesis and without requiring/requesting feedback of parent timing runs for the unit.

In addition to one or more of the features described above or below, or as an alternative, in further embodiments of the invention the at least one pin is an input pin of the macro, the input pin being configured to receive a signal on a metal layer associated with a unit comprising the macro. One or more embodiments advantageously determine the updated timing constraint for the input pin moved within a macro during synthesis based on the metal layer of the unit, without further iterations of the synthesis and without requiring/requesting feedback of parent timing runs for the unit.

In addition to one or more of the features described above or below, or as an alternative, in further embodiments of the invention an input for performing the synthesis comprises the specification, the specification comprising placement of pins, timing constraints, and a list of pins to be moved, the list comprising the at least one pin of the macro; and an output resulting from performing the synthesis comprises a timing optimized netlist accounting for the new location of the at least one pin. One or more embodiments advantageously determine the updated timing constraint for the listed pins moved within a macro during synthesis based on the metal layer of the unit, without further iterations of the synthesis and without requiring/requesting feedback of parent timing runs for the unit.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 is a flowchart of a computer-implemented method for using out-of-context timing constraints modification for interior pins of a macro in an IC, thereby resulting in a chip design utilized to fabricate the IC according to one or more embodiments of the present invention;

FIG. 8 is a block diagram of a system to design/layout of an IC using out-of-context timing constraints modification for interior pins of a macro in an IC in accordance with one or more embodiments of the present invention; and FIG. 9 is a process flow of a method of fabricating the IC of FIG. 8 in accordance with one or more embodiments of the present invention.

DETAILED DESCRIPTION

Figure 1:
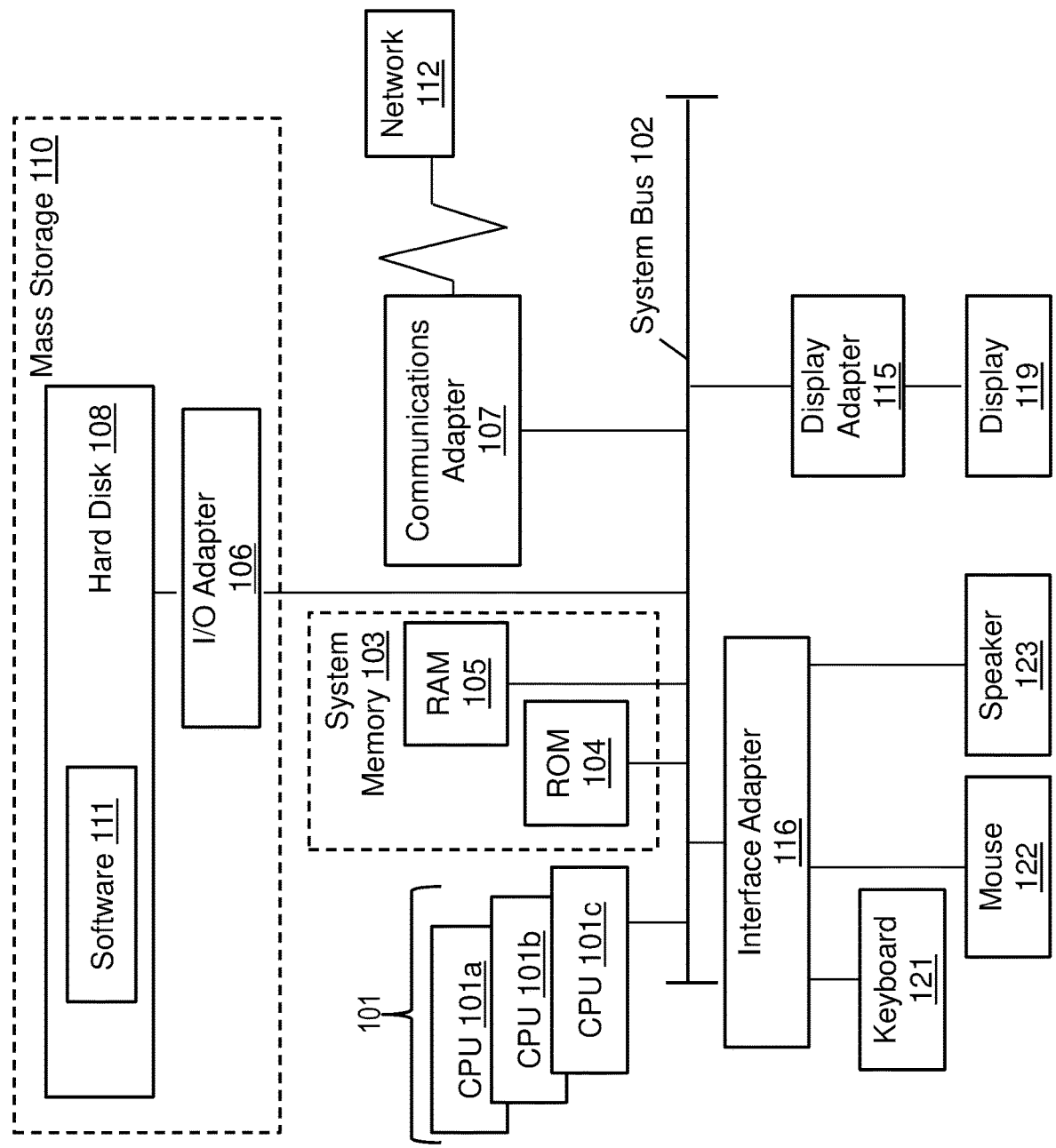
FIG. 1 depicts a block diagram of an example computer system for use in conjunction with one or more embodiments of the present invention.

One or more embodiments of the invention are configured to utilize a system for out-of-context timing constraints modification for interior pins of macros. According to one or more embodiments of the invention, a list of interior pins that will move during synthesis is provided. For example, the user may input the list of pins. The system is configured to calculate the distance of the new location of the pin moved from the original location. If the parent level driving layer information is available, the system calculates the delta resistance capacitance (RC) delay and the delta capacitance load using the parent level driving layer information. If the parent level driving layer information is not available, the system calculates the delta RC delay and the delta capacitance load using the macro ceiling metal layer plus 1 (+1) metal layer. The system is configured to optimize timing during synthesis using the updated timing constraints.

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Current methodology allows for pins on a macro to move internally, mainly with a goal to improve timing at the parent level. This has a limitation that it does not modify timing constraints for those interior pins which actually move in the macro, and synthesis continues to work on the timing for those interior pins using the original timing constraints (i.e., using the original required arrival time and capacitance loads for output pins and using the original arrival time for input pin).

One or more embodiments of the invention are arranged and configured to provide a method to modify the timing constraints of the interior pins which move internally within the macro, based on the distance the interior pin(s) move from their original placement. This has benefits and technical solutions of reducing the number of iterations needed to settle the assertions for macros which normally use feedback from parent timing runs. As further benefits and technical solutions, one or more embodiments are configured to modify timing constraints for those interior pins which move in the macro, while synthesis continues to work on the timing for those interior pins using the updated timing constraints (i.e., using a new/updated required arrival time and a new/updated capacitance load for output pins and using a new/updated arrival time for input pins) to thereby meet the timing constraints set by the parent design, all of which occurs without further iterations of the synthesis and without requiring/requesting feedback of parent timing runs for the unit.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
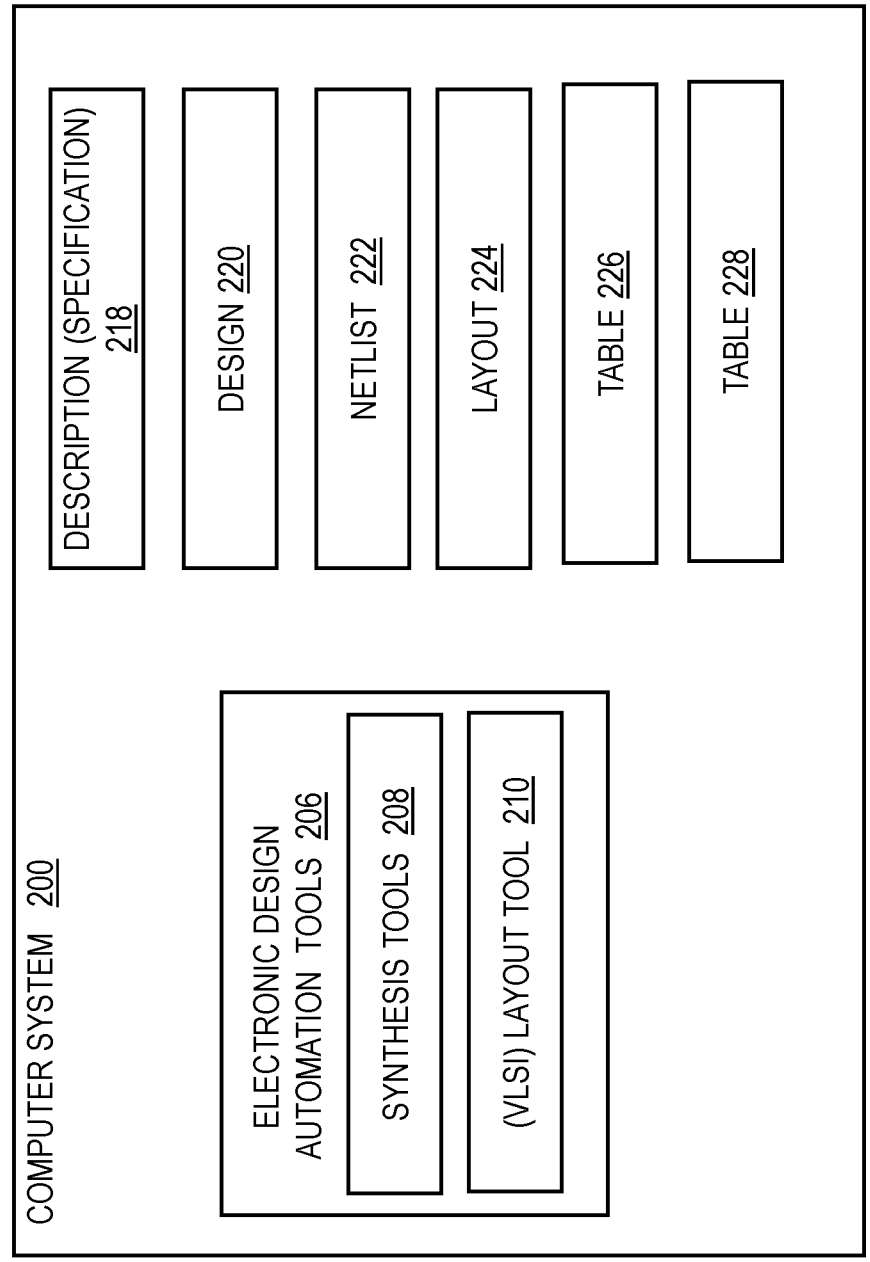
FIG. 2 is a block diagram of a computer system using out-of-context timing constraints modification for interior pins in a macro during synthesis, thereby generating a chip design resulting from the synthesis which is used to fabricate a semiconductor structure for an IC according to one or more embodiments of the present invention.

FIG. 2 is a block diagram of a computer system 200 using out-of-context timing constraints modification for interior pins in a macro during synthesis, thereby generating a chip design resulting from the synthesis which is used to fabricate a semiconductor structure for an IC and/or cause the semiconductor structure for the IC to be fabricated according to one or more embodiments of the invention. Elements of computer system 100 may be used in and/or integrated into computers system 200. Electronic design automation (EDA) tools 206 may be implemented as software 111 executed on one or more processors 101, as discussed in FIG. 1. EDA tools 206 may include, be coupled to, call, and/or be representative of various EDA tools including but not limited to synthesis tools 208, a layout tools 210 (such as a very large-scale integration (VLSI) IC tool), signoff tools, etc., for generating, providing, testing, and/or modifying one or more designs 220 and layouts 224 for an IC. As understood by one of ordinary skill in the art, a combination of EDA tools is utilized in the design flow to accomplish the design of an IC. Moreover, electronic design automation, also referred to as electronic computer-aided design (ECAD), is a category of software tools for designing electronic systems such as ICs. The tools work together in the design flow that chip designers use to design and analyze entire semiconductor chips.

Figure 3:
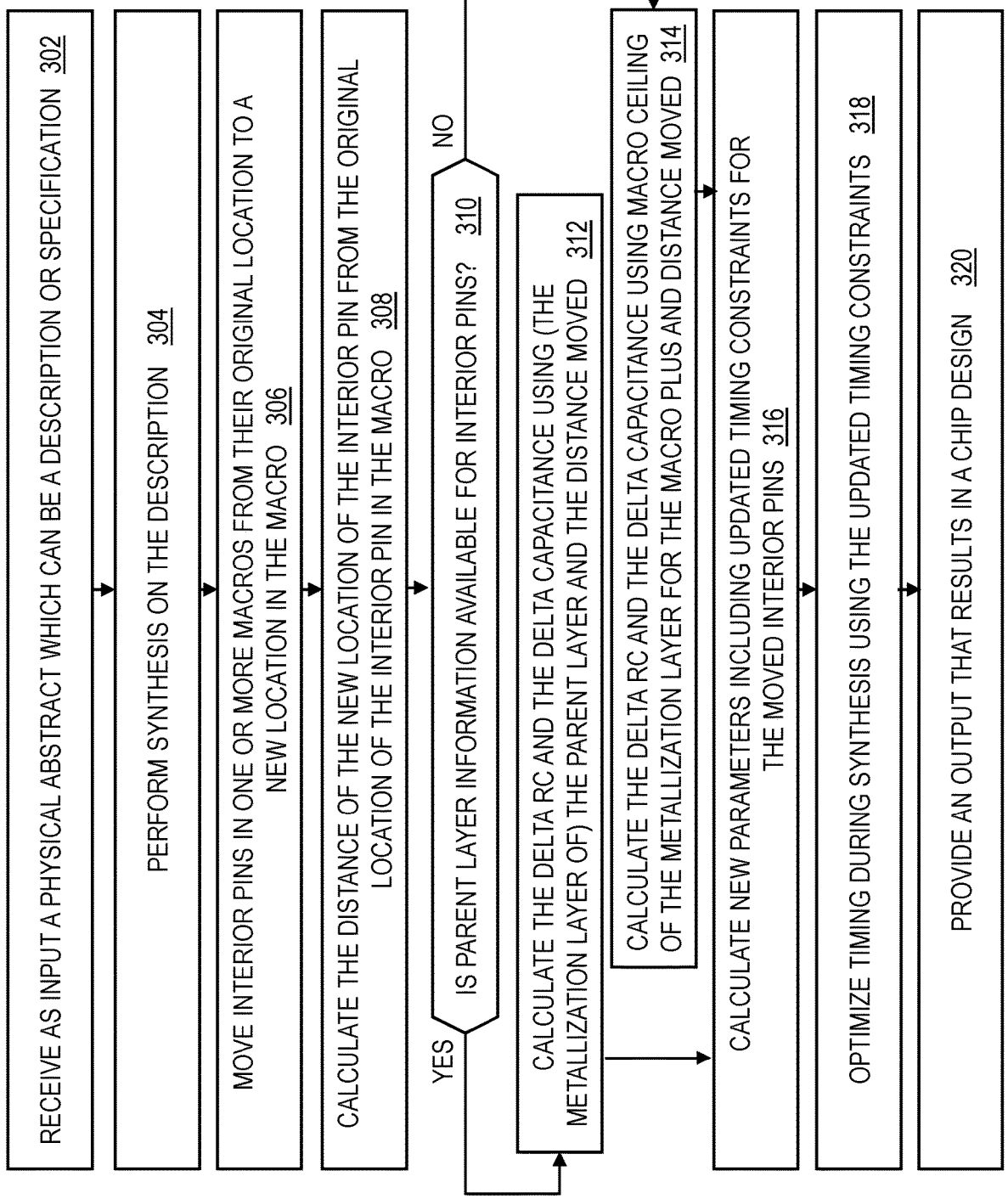
FIG. 3 is a flowchart of a process using out-of-context timing constraints modification for interior pins in a macro during synthesis, thereby generating a chip design resulting from the synthesis which is used to fabricate a semiconductor structure for an IC according to one or more embodiments of the present invention.

FIG. 3 is a flowchart of a process 300 using out-of-context timing constraints modification for interior pins in a macro during synthesis, thereby generating a chip design resulting from the physical synthesis which is used to fabricate a semiconductor structure for an IC and/or cause the semiconductor structure for the IC to be fabricated according to one or more embodiments of the invention.

At block 302, the EDA tools 206 are configured to receive as input a physical abstract which can be description 218 or specification. The physical abstract such as description 218 includes placed pins, timing constraints, and a list of pins in one or macros to be moved internally. The macros are specified in advance which have pins that are going to be moved further inside the macro itself, and the movement of the interior pins affects the signal timing at the interior pins, as discussed further herein. Also, some pins of the macro can move from edge to the interior, from one interior location to another interior location, and/or from the interior to the edge. A parent timing run analysis determines which pins on which macros need to move interior to the macro to improve timing. This information is then passed as an input to the macros for synthesis runs.

At block 304, the EDA tools 206 are configured to perform synthesis on the description 218. The EDA tools 206 may call, invoke, and/or include synthesis tools 208 configured to perform synthesis of the description 218. The description 218 can be referred to interchangeably as the physical abstract or specification. The description 218 may include a register transfer level (RTL) description of the design. The synthesis tools 208 may include high-level synthesis, logic synthesis, etc. High-level synthesis (HLS), sometimes referred to as C synthesis, electronic system-level (ESL) synthesis, algorithmic synthesis, or behavioral synthesis, is an automated design process that takes an abstract behavioral specification of a digital system and finds a register-transfer level structure that realizes the given behavior. Logic synthesis is a process by which an abstract specification of desired circuit behavior, typically at the register transfer level, is turned into a design implementation in terms of logic gates, typically by a computer program called a synthesis tool. Common examples of this process include synthesis of designs specified in hardware description languages including VHDL and Verilog.

Figure 4:
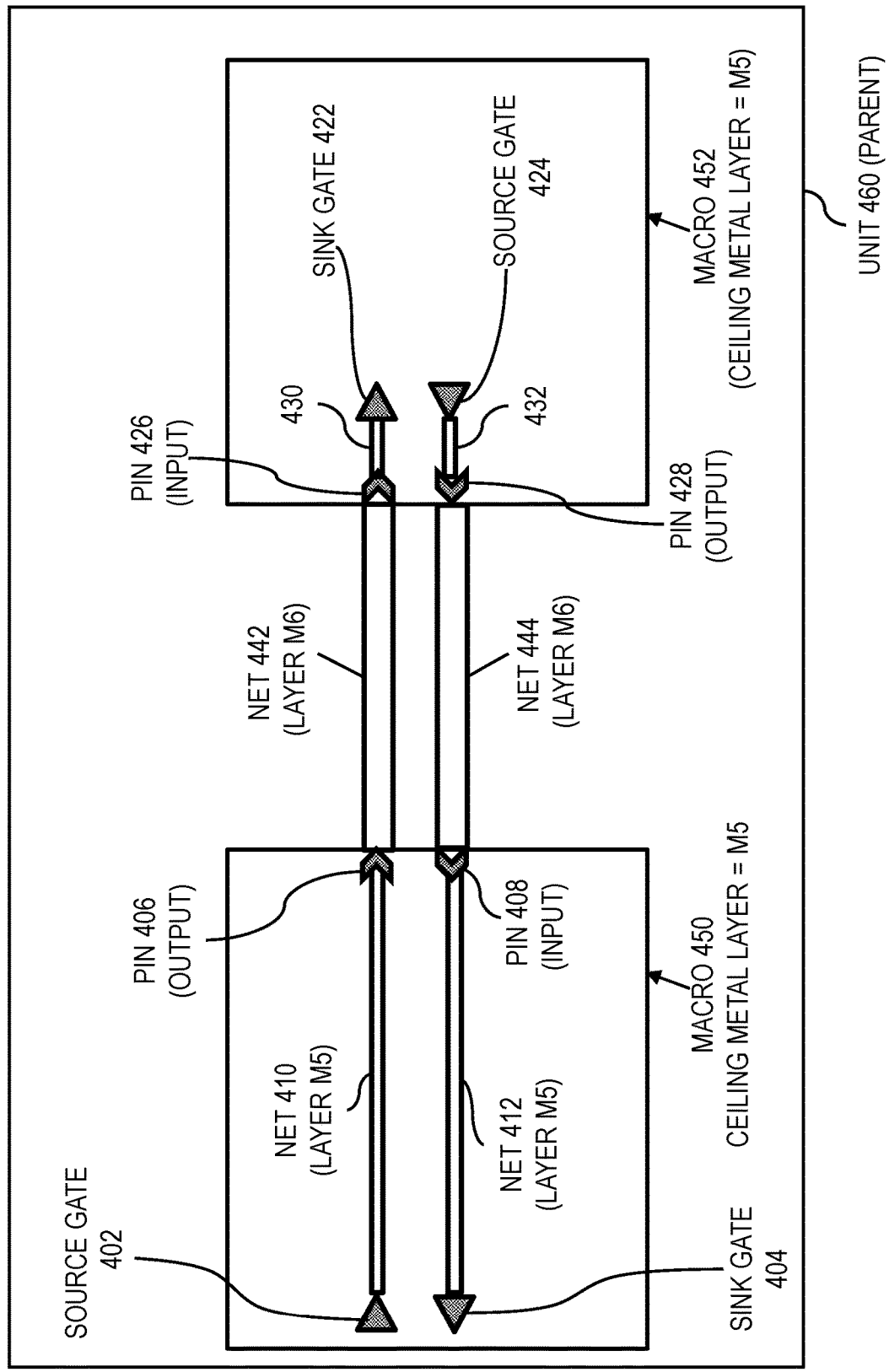
FIG. 4 depicts a block diagram illustrating a portion of an IC based on the description according to one or more embodiments of the present invention.

FIG. 4 depicts a block diagram illustrating a portion of an IC 400 based on the description 218 according to one or more embodiments of the invention. As noted above, the description 218 is utilized as input to synthesis tools 208 for the IC 400 and now synthesis is being performed. The IC 400 has many units, and each unit has macros. In FIG. 4, the IC 400 includes example macro 450 and macro 452 in parent unit 460. Although two macros are illustrated in FIG. 4, it should be appreciated that a unit may have more than two macros with various interconnections.

In a hierarchical design approach, the logic of an IC or chip is partitioned into smaller portions that are assigned to predefined areas of the chip. These smaller design portions (which may comprise area, logic, interconnects, and timing assertions) are typically referred to as macros. Usually, some logic will not be assigned to any macro, and this logic is considered as being on the top level of the hierarchy. It may well be that the hierarchy is nested, and a chip is partitioned into one or more units where each unit is partitioned into one or more macros. The top level is typically referred to as a unit and the lower level(s) as macros. A port of a macro is the point (or small area) at which the internal and external signals are connected to each other. There are some guidelines from the design team on which ports should be close to each other. The size of the macro as well as the x and y dimensions of the macro outlines are given and assumed to be fixed.

In FIG. 4, macros 450, 452 may include various combinational logic circuits or components. The macros 450, 452 may include sequential logic circuits or components. It should be appreciated that macros can include any desired logic circuits. In FIG. 4, macro 450 includes source gate 402 connected to output pin 406 via net 410. Also, macro 450 includes sink gate 404 connected to input pin 408 via net 412. In macro 450, nets 410, 412 are internal to macro 450 and can be metal layer M5. Metal layer M5 can also be referred to as metallization layer M5 or simply M5. A typical IC can have 10, 15, or more metal layers, where higher metal layers have a faster speed for transmitting signals (i.e., conducting electrical current) than lower metal layers because of their increased width. As such, and electrical timing signal sent on metal layer M6 is faster than on metal layer M5 under the same conditions. It is noted that macros 450, 452 have a ceiling metal layer value equal to M5 which means that any nets in macros 450, 452 can be up to the metal layer M5. Although not shown in macros 450, 452 for the sake of clarity, there can be other nets (e.g., connecting components of logic gates) that have a metal layer less than the ceiling metal layer of M5. It should be appreciated that although metal layer M5 is utilized as the ceiling metal layer, this example is provided for explanation purposes. Macros can have a lower or higher ceiling metal layer than metal layer M5.

Similarly, macro 452 includes source gate 424 connected to output pin 428 via net 432. Also, macro 452 includes sink gate 422 connected to input pin 426 via net 430. In macro 452, nets 430, 432 are internal to macro 452 and can be metal layer M5. As the parent of macros 450, 452, the unit 460 has net 442 connecting output pin 406 of macro 450 to input pin 426 of macro 452 and has net 444 connecting output pin 428 of macro 452 to input pin 408 of macro 450. The nets 442, 444 of unit 460 have metal layer M6 which is higher than the ceiling metal layer M5 of macros 450, 452. As understood by one of ordinary skill in the art, timing signals, as electrical current, flows over nets 410, 412, 430, 432, 442, 444 in order for the IC 400 to function as designed.

Timing constraints and parameters of the description 218 include a required arrival time for output pins, an arrival time for input pins, and a capacitance constraint (i.e., capacitance load), along with others as understood by one of ordinary skill in the art. For illustration purposes, example timing constraints and parameters and scenarios are for macro 450 but apply by analogy to any other macros in unit 460. For macro 450, the required arrival time is 200 picoseconds (ps) of the signal at output pin 406 and the capacitance constraint (i.e., capacitance load) is 100 femtofarads (fF) at output pin 406. In other words, a signal is transmitted from source gate 402 via net 410 to arrive at output pin 406 at 200 ps in the clock cycle in which the clock cycle time is, for example, 400 ps. The arrival time is 250 ps at input pin 408, which means that an input signal arrives at input pin 408 from output pin 428 via net 444. The capacitance load is the capacitance (of the load) as seen by output pin 406.

Referring to FIG. 3, at blocks 306, 308, the EDA tools 206 are configured to move pins in one or more macros from their original location to a new location in the macro, and then calculate the distance of the new location of the interior pin from the original location of the pin in the macro. This results in the distance moved for the interior pin from the original pin location to the new pin location.

Figure 5:
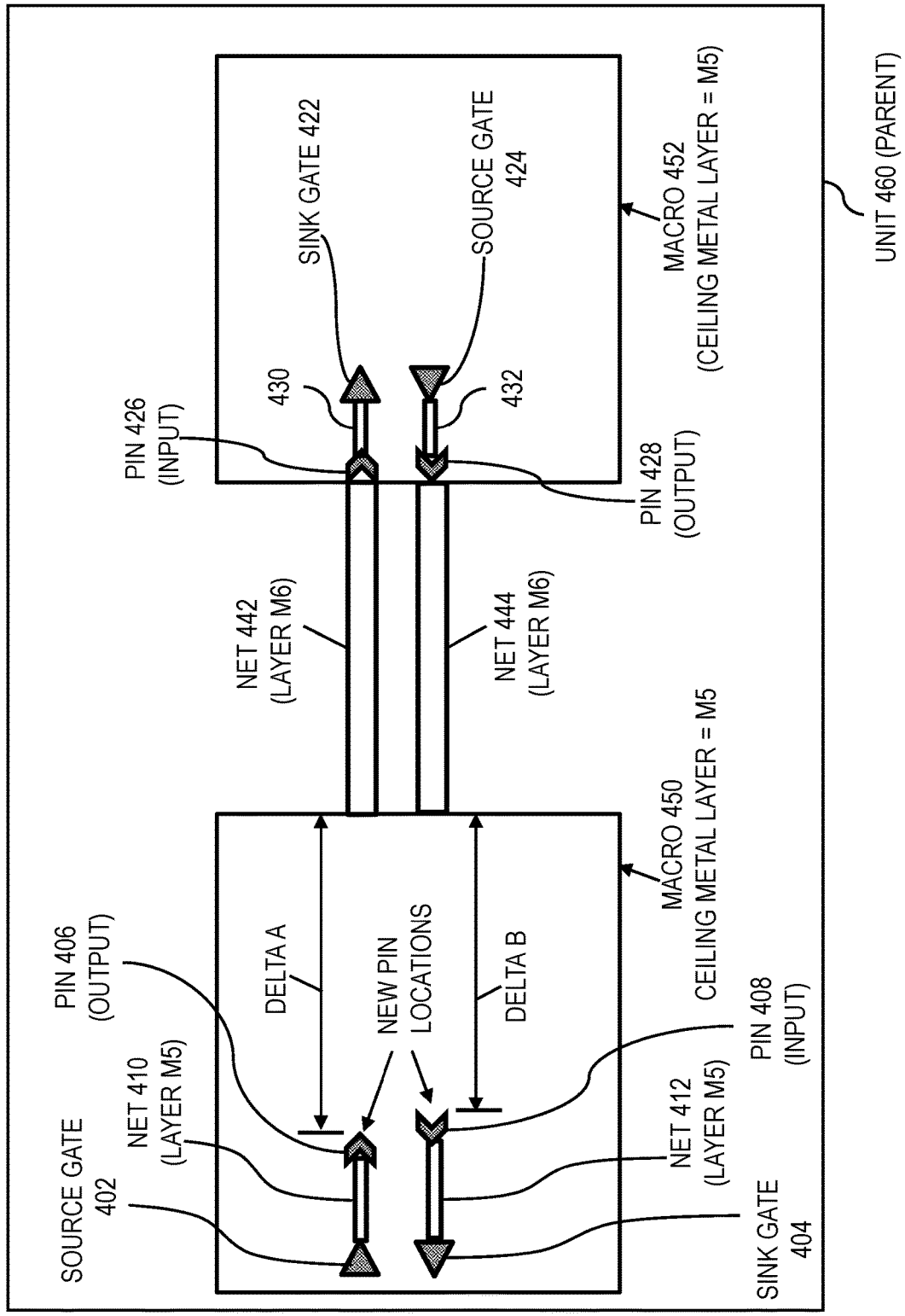
FIG. 5 depicts a block diagram illustrating a portion of the IC based on the description according to one or more embodiments of the present invention.

FIG. 5 depicts a block diagram illustrating a portion of an IC 400 based on the description 218 according to one or more embodiments of the invention. As noted above, the description 218 includes a list of pins to be moved in the macros of the IC 400 during synthesis. It is noted that pins 406, 408, 426, 428 are pins of their respective macros. In the example scenario depicted in FIG. 5, (interior) output pin 406 and input pin 408 have been moved to their respective new locations in macro 450 during synthesis, and the updated timing constraints for the new locations of the pins can be determined below without requiring any subsequent iteration(s) of synthesis and without requiring/requesting parent timing information for the unit. The change in distance from the old pin location (depicted in FIG. 4) to the new pin location for output pin 406 is illustrated as delta A, while the change in distance from the old pin location to the new pin location for input pin 408 is illustrated as delta B. In the example scenario, delta A is 150 microns or mircometers (μm) and delta B is 120 μm in macro 450 of FIG. 5.

Referring to FIG. 3, at block 310, the EDA tools 206 are configured to check if parent layer information of the unit is available for the interior pins that have been moved in the macros. It is noted that the synthesis tools 208 perform synthesis on the macros inside unit, and parent layer information of the unit may or may not be available. At block 312, if (Yes) the parent layer (metallization) information is available, the EDA tools 206 are configured to calculate the delta RC delay and the delta capacitance load using (the metallization layer of) the parent layer and the distance moved. It is assumed that the metal layer of the parent layer, for example, unit 460 is metal layer M6.

Using a lookup table 226, EDA tools 206 are configured to look up the extended length (e.g., the distance moved from the original pin location to the new pin location) of the metal layer in order to obtain the delta RC delay. For different types of metal layer materials, each metal layer has an RC delay in a semiconductor structure. This RC delay for the metal layer is the delta RC delay for the given length of the metal layer. The RC delay is the delay in signal speed through the circuit wiring as a result of the resistance (R) of the wire and capacitance (C) which is the degree to which an insulating material (surrounding insulator material) holds a charge. The lookup table 226 includes the RC delay for different lengths and different metal layers (e.g., metal layer M1 through metal layer MX, where X is the last metal layer in the IC). For example, using delta A (i.e., distance or length from the old pin location to the new pin location), EDA tools 206 are configured to search for the length delta A for metal layer M6 in lookup table 226 in order to determine that the RC delay for delta A (which corresponds to extended metal layer 602 in FIG. 6). Likewise, using delta B (i.e., distance or length from the old pin location to the new pin location), EDA tools 206 are configured to search for the length delta B for metal layer M6 in lookup table 226 in order to determine that the RC delay for delta B (which corresponds to extended metal layer 604 in FIG. 6). The x and y coordinates of the macros, as well as the unit, are known in advance such that the EDA tools 206 can determine the distance between any pins in any direction.

Using the parent metal layer (e.g., metal layer M6), EDA tools 206 are configured to look up the delta capacitance (load) for the increased length (e.g., the distance moved from the original pin location to the new pin location) of the parent metal layer in a lookup table 228. Based on the delta B being 120 μm, the example delta capacitance is 40 fF in the look up table 228. Additional wire between the new and old pin locations accounts for the delta capacitance.

At block 314, if (No) the parent layer (metallization) information is not available to the macro, the EDA tools 206 are configured to calculate the delta RC delay and the delta capacitance load using the metal layer ceiling of the metallization layer for the macro plus and distance moved. The information of the metal layer for the parent layer, for unit 460, may not be available. In such a case, the ceiling metal layer of the macro is increased by 1 to the next highest metal layer, and this next highest metal layer is utilized. For example, the ceiling metal layer is M5 in macro 452, so incrementing by 1 results in metal layer M6. As discussed above, the delta RC delay for the extended length (e.g., the distance moved from the original pin location to the new pin location (i.e., the length for delta A and the length for delta B) of the metal layer is searched in lookup table 226 in order to obtain the RC delay. As discussed above, using the ceiling metal layer incremented by 1 (e.g., metal layer M5 plus 1 which equals metal layer M6), EDA tools 206 are configured to look up the capacitance (load) for the increased length (e.g., the distance moved from the original pin location to the new pin location) of metal layer M6 in the lookup table 228.

Figure 6:
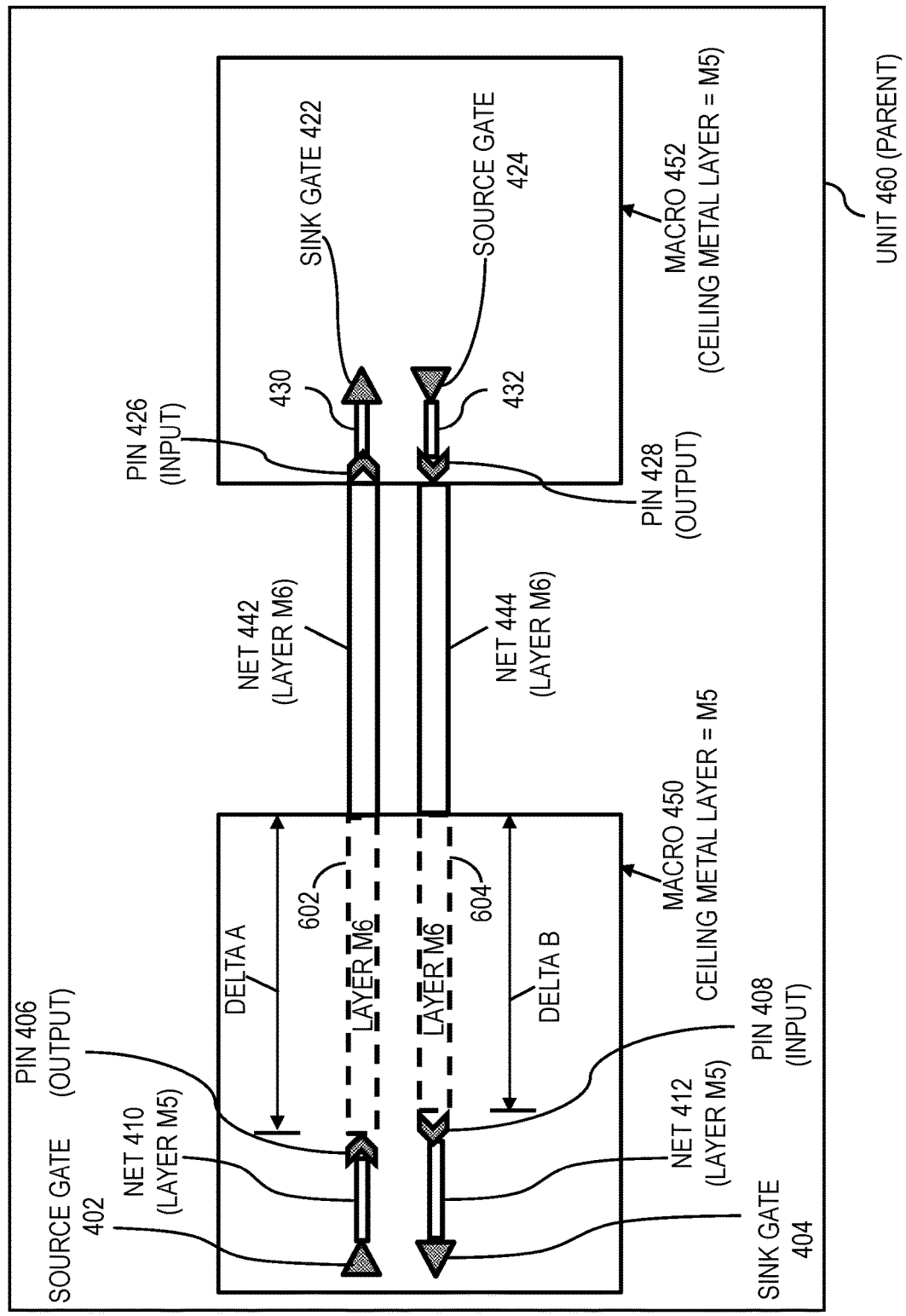
FIG. 6 depicts a block diagram illustrating a portion of the IC based on the description according to one or more embodiments of the present invention.

FIG. 6 depicts a block diagram illustrating a portion of the IC 400 based on the description 218 according to one or more embodiments of the invention. As seen in FIG. 6, metal layer M6 of the unit 460 is utilized to connect the distance delta A, from the old pin location to the new pin location, for output pin 406. Accordingly, net 442 of the unit 460 is extended the distance delta A in order to complete the connection to output pin 406 at the new location. The extended metal layer for net 442 is represented with a dashed line and is designated as extended metal layer 602. Similarly, metal layer M6 of the unit 460 is utilized to connect the distance delta B, from the old pin location to the new pin location, for input pin 408. Accordingly, net 444 of the unit 460 is extended the distance delta B in order to complete the connection to input pin 408 at the new location. Analogously, the extended metal layer for net 444 is represented with a dashed line and is designated as extended metal layer 604.

Referring to FIG. 3, at block 316, the EDA tools 206 are configured to calculate new parameters including updated timing constraints for the moved interior pins. For a given output pin, the new required arrival time is equal to the original arrival time minus the delta RC delay. For a given output pin, the new capacitance load is equal to the original capacitance load plus the delta capacitance load. For a given input pin, the new arrival time is equal to the original arrival time plus the delta RC delay. Continuing the example scenario for IC 400, for output pin 406, the new required arrival time is 200−30=170 ps, where the required original arrival time is 200 ps and the delta RC delay (for the output pin) is 30 ps. For output pin 406, since the delta capacitance is 50 fF and the original capacitance is 100 fF, the new capacitance load is 100+50=150 fF. For the input pin 408, the new arrival time is 250+25=275 ps, where the original arrival time is 250 ps and the delta RC delay (for the input pin) is 25 ps.

At block 318, the EDA tools 206 are configured to optimize timing during synthesis using the updated timing constraints. During synthesis, known processes improve or optimize timing based on the timing constraints. For example, this could involve increasing the size of the gates used in the circuits. A tighter timing constraint make synthesis work harder on improving timing of the macro.

At block 320, the EDA tools 206 are configured to provide an output that results in a chip design 220, using well-known processes as understood by one of ordinary skill in the art. The output includes a timing optimized netlist 222 that accounts for the updated pin locations. For example, the physical design is based on a netlist which is the end result of the synthesis process. Synthesis converts the RTL design usually coded in VHDL or Verilog HDL to gate-level descriptions which the next set of tools can read/understand. This netlist contains information on the cells used, their interconnections, area used, and other details. As noted herein, during the synthesis process, constraints are applied to ensure that the design meets the required functionality and speed (specifications). After the netlist is verified for functionality and timing, the netlist is sent for the physical design resulting in the chip design 220. After processing during the physical design, the chip design 220 is used by a layout tool, such as VLSI layout tool 210, to generate a layout 224 which is utilized to fabricate the IC.

FIG. 7 is a flowchart of a computer-implemented method 700 using out-of-context timing constraints modification for interior pins of a macro in an IC, thereby resulting in a chip design utilized to fabricate the IC according to one or more embodiments. Reference can be made to FIGS. 1-6.

At block 702, EDA tools 206 are configured to move at least one pin of a macro (e.g., macro 450, 452) during synthesis for an IC 400, in response to performing synthesis on a specification (e.g., description 218) for the IC 400. At block 704, EDA tools 206 are configured to determine a distance (e.g., delta A, delta B) that the at least one pin moved from an original location to a new location in the macro. At block 706, EDA tools 206 are configured to determine a delay (e.g., the delta RC delay) based at least in part on the distance (e.g., delta A, delta B) moved. At block 708, EDA tools 206 are configured to use the delay (e.g., the delta RC delay) to determine a signal timing at the least one interior pin at the new location (e.g., output pin 406, input pin 408 depicted in FIGS. 5 and 6) in the macro.

The signal timing is determined based on a metal layer associated with a unit (e.g., metal layer M6 for unit 460) comprising the macro (e.g., macros 450, 452). The signal timing is determined based on a metal layer that is greater than a metal layer ceiling of the macro (e.g., a metal layer that is greater that metal layer M5 for macro 450). The at least one interior pin is an output pin 406 of the macro 450, the output pin being configured to output a signal on a metal layer (e.g., metal layer M6 of net 442) associated with a unit 460 comprising the macro 450. The at least one interior pin is an input pin 408 of the macro 450, the input pin being configured to receive input of a signal from a metal layer (e.g., metal layer M6 of net 444) associated with a unit 460 comprising the macro 450.

An input for performing the synthesis comprises the specification (e.g., description 218, the specification comprising placement of pins, timing constraints, and a list of pins to be moved, the list comprising the at least one interior pin (e.g., output pin 406, input pin 408) of the macro; and an output resulting from performing the synthesis comprises a timing optimized netlist (e.g., netlist 222) accounting for the new location of the at least one interior pin. A metal layer (e.g., metal layer M6) is associated with a unit 460 comprising the macro 450, the metal layer (e.g., the meta layer M6 of nets 442, 444) being coupled to the at least one interior pin and another macro 452 in the unit.

FIG. 8 is a block diagram of a system 800 according to embodiments of the invention. The system 800 includes processing circuitry 810 used to generate the design 830 that is ultimately fabricated into an integrated circuit 820 (e.g., IC 400), which can include a variety of active semiconductor devices. The steps involved in the fabrication of the integrated circuit 820 are well-known and briefly described herein. Once the physical layout 840 is finalized, based, in part, on using out-of-context timing constraints modification for interior pins of macros in the IC 400 according to embodiments of the invention, the finalized physical layout 840 is provided to a foundry. Masks are generated for each layer of the integrated circuit based on the finalized physical layout. Then, the wafer is processed in the sequence of the mask order. The processing includes photolithography and etch. This is further discussed with reference to FIG. 9.

FIG. 9 is a process flow of a method of fabricating the integrated circuit according to exemplary embodiments of the invention. Once the physical design data is obtained, based, in part, using out-of-context timing constraints modification for interior pins of macros in the IC 400, the integrated circuit 820 can be fabricated according to known processes that are generally described with reference to FIG. 9. Generally, a wafer with multiple copies of the final design is fabricated and cut (i.e., diced) such that each die is one copy of the integrated circuit 820. At block 910, the processes include fabricating masks for lithography based on the finalized physical layout. At block 920, fabricating the wafer includes using the masks to perform photolithography and etching. Once the wafer is diced, testing and sorting each die is performed, at block 930, to filter out any faulty die.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The phrase "selective to," such as, for example, "a first element selective to a second element," means that the first element can be etched and the second element can act as an etch stop.

As used herein, "p-type" refers to the addition of impurities to an intrinsic semiconductor that creates deficiencies of valence electrons. In a silicon-containing substrate, examples of p-type dopants, i.e., impurities, include but are not limited to: boron, aluminum, gallium and indium.

As used herein, "n-type" refers to the addition of impurities that contributes free electrons to an intrinsic semiconductor. In a silicon containing substrate examples of n-type dopants, i.e., impurities, include but are not limited to antimony, arsenic and phosphorous.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device.

As noted above, atomic layer etching processes can be used in the present invention for via residue removal, such as can be caused by via misalignment. The atomic layer etch process provide precise etching of metals using a plasma-based approach or an electrochemical approach. The atomic layer etching processes are generally defined by two well-defined, sequential, self-limiting reaction steps that can be independently controlled. The process generally includes passivation followed selective removal of the passivation layer and can be used to remove thin metal layers on the order of nanometers. An exemplary plasma-based approach generally includes a two-step process that generally includes exposing a metal such a copper to chlorine and hydrogen plasmas at low temperature (below 20° C.). This process generates a volatile etch product that minimizes surface contamination. In another example, cyclic exposure to an oxidant and hexafluoroacetylacetone (Hhfac) at an elevated temperature such as at 275° C. can be used to selectively etch a metal such as copper. An exemplary electrochemical approach also can include two steps. A first step includes surface-limited sulfidization of the metal such as copper to form a metal sulfide, e.g., $Cu_2S$, followed by selective wet etching of the metal sulfide, e.g., etching of $Cu_2S$ in HCl. Atomic layer etching is relatively recent technology and optimization for a specific metal is well within the skill of those in the art. The reactions at the surface provide high selectivity and minimal or no attack of exposed dielectric surfaces.

Semiconductor lithography is the formation of three-dimensional relief images or patterns on the semiconductor substrate for subsequent transfer of the pattern to the substrate. In semiconductor lithography, the patterns are formed by a light sensitive polymer called a photoresist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The photoresist can be formed using conventional deposition techniques such chemical vapor deposition, plasma vapor deposition, sputtering, dip coating, spin-on coating, brushing, spraying and other like deposition techniques can be employed. Following formation of the photoresist, the photoresist is exposed to a desired pattern of radiation such as X-ray radiation, extreme ultraviolet (EUV) radiation, electron beam radiation or the like. Next, the exposed photoresist is developed utilizing a conventional resist development process.

After the development step, the etching step can be performed to transfer the pattern from the patterned photoresist into the interlayer dielectric. The etching step used in forming the at least one opening can include a dry etching process (including, for example, reactive ion etching, ion beam etching, plasma etching or laser ablation), a wet chemical etching process or any combination thereof.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   moving at least one pin of a macro during synthesis for an integrated circuit (IC), the macro being part of a unit, the moving being in response to performing the synthesis on a specification for the IC;
   determining a distance that the at least one pin moved from an original location to a new location in the macro;
   checking whether parent layer information of the unit is available for interior pins to determine the delay of a metal layer associated with the distance, wherein a determination is made to use one of a first option or a second option for a metal level of the metal layer, wherein the first option comprises using the metal level according to that which is utilized in the unit when the parent layer information of the unit is available, wherein the second option comprises determining that the metal level is to be one level higher than that which is utilized in the macro;
   determining a delay based at least in part on the distance that is moved and the metal level of the metal layer for one of the first option and the second option; and
   using the delay to determine a signal timing at the least one pin at the new location in the macro.

2. The computer-implemented method of claim 1, wherein the signal timing is determined based on the metal layer associated with the unit comprising the macro.

3. The computer-implemented method of claim 1, wherein the signal timing is determined based on the metal layer that is greater than the metal layer ceiling of the macro.

4. The computer-implemented method of claim 1, wherein the at least one pin is an output pin of the macro, the output pin being configured to output a signal on the metal layer associated with the unit comprising the macro.

5. The computer-implemented method of claim 1, wherein the at least one pin is an input pin of the macro, the input pin being configured to receive input of a signal from the metal layer associated with the unit comprising the macro.

6. The computer-implemented method of claim 1, wherein:
   an input for performing the synthesis comprises the specification, the specification comprising placement of pins, timing constraints, and a list of pins to be moved, the list of pins comprising the at least one pin of the macro; and
   an output resulting from performing the synthesis comprises a timing optimized netlist accounting for the new location of the at least one pin.

7. The computer-implemented method of claim 1, wherein the metal layer is associated with the unit comprising the macro, the metal layer being coupled to the at least one pin and another macro in the unit; and
   wherein the distance reflects a change distanced between the at least one pin in the macro and the another macro within the unit.

8. A system comprising:
   a memory having computer readable instructions; and
   one or more processors for executing the computer readable instructions, the computer readable instructions controlling the one or more processors to perform operations comprising:
   moving at least one pin of a macro during synthesis for an integrated circuit (IC), the macro being part of a unit, the moving being in response to performing the synthesis on a specification for the IC;
   determining a distance that the at least one pin moved from an original location to a new location in the macro;
   checking whether parent layer information of the unit is available for interior pins to determine the delay of a metal layer associated with the distance, wherein a determination is made to use one of a first option or a second option for a metal level of the metal layer, wherein the first option comprises using the metal level according to that which is utilized in the unit when the parent layer information of the unit is available, wherein the second option comprises determining that the metal level is to be one level higher than that which is utilized in the macro;
   determining a delay based at least in part on the distance that is moved and the metal level of the metal layer for one of the first option and the second option; and
   using the delay to determine a signal timing at the least one pin at the new location in the macro.

9. The system of claim 8, wherein the signal timing is determined based on the metal layer associated with the unit comprising the macro.

10. The system of claim 8, wherein the signal timing is determined based on the metal layer that is greater than the metal layer ceiling of the macro.

11. The system of claim 8, wherein the at least one pin is an output pin of the macro, the output pin being configured to output a signal on the metal layer associated with the unit comprising the macro.

12. The system of claim 8, wherein the at least one pin is an input pin of the macro, the input pin being configured to receive input of a signal from the metal layer associated with the unit comprising the macro.

13. The system of claim 8, wherein:
an input for performing the synthesis comprises the specification, the specification comprising placement of pins, timing constraints, and a list of pins to be moved, the list of pins comprising the at least one pin of the macro; and
an output resulting from performing the synthesis comprises a timing optimized netlist accounting for the new location of the at least one pin.

14. The system of claim 8, wherein the metal layer is associated with the unit comprising the macro, the metal layer being coupled to the at least one pin and another macro in the unit; and
wherein the distance reflects a change distanced between the at least one pin in the macro and the another macro within the unit.

15. A computer program product comprising a computer readable storage medium having program instructions embodied therewith, the program instructions executable by one or more processors to cause the one or more processors to perform operations comprising:
moving at least one pin of a macro during synthesis for an integrated circuit (IC), the macro being part of a unit, the moving being in response to performing the synthesis on a specification for the IC;
determining a distance that the at least one pin moved from an original location to a new location in the macro;
checking whether parent layer information of the unit is available for interior pins to determine the delay of a metal layer associated with the distance, wherein a determination is made to use one of a first option or a second option for a metal level of the metal layer, wherein the first option comprises using the metal level according to that which is utilized in the unit when the parent layer information of the unit is available, wherein the second option comprises determining that the metal level is to be one level higher than that which is utilized in the macro;
determining a delay based at least in part on the distance that is moved and the metal level of the metal layer for one of the first option and the second option; and
using the delay to determine a signal timing at the least one pin at the new location in the macro.

16. The computer program product of claim 15, wherein the signal timing is determined based on the metal layer associated with the unit comprising the macro.

17. The computer program product of claim 15, wherein the signal timing is determined based on the metal layer that is greater than the metal layer ceiling of the macro.

18. The computer program product of claim 15, wherein the at least one pin is an output pin of the macro, the output pin being configured to output a signal on the metal layer associated with the unit comprising the macro.

19. The computer program product of claim 15, wherein the at least one pin is an input pin of the macro, the input pin being configured to receive input of a signal from the metal layer associated with the unit comprising the macro.

20. The computer program product of claim 15, wherein:
an input for performing the synthesis comprises the specification, the specification comprising placement of pins, timing constraints, and a list of pins to be moved, the list of pins comprising the at least one pin of the macro; and
an output resulting from performing the synthesis comprises a timing optimized netlist accounting for the new location of the at least one pin.

* * * * *